(12) United States Patent
Pfeffer et al.

(10) Patent No.: US 9,104,654 B2
(45) Date of Patent: Aug. 11, 2015

(54) METHOD AND DEVICE FOR EFFICIENT TRACE ANALYSIS

(71) Applicant: SANDISK TECHNOLOGIES INC., Plano, TX (US)

(72) Inventors: Daniel Moshe Pfeffer, Modi'in (IL); Judah Gamliel Hahn, Ofra (IL); Yacov Duzly, Ra'anana (IL)

(73) Assignee: SANDISK TECHNOLOGIES INC., Plano, TX (US)

( * ) Notice: Subject to any disclaimer, the term of this patent is extended or adjusted under 35 U.S.C. 154(b) by 120 days.

(21) Appl. No.: 14/021,538

(22) Filed: Sep. 9, 2013

(65) Prior Publication Data

US 2015/0074465 A1  Mar. 12, 2015

(51) Int. Cl.
*G06F 11/00* (2006.01)
*G06F 11/25* (2006.01)
*G06F 11/30* (2006.01)

(52) U.S. Cl.
CPC ............ *G06F 11/25* (2013.01); *G06F 11/3041* (2013.01)

(58) Field of Classification Search
CPC .................................................. G06F 11/3041
See application file for complete search history.

(56) References Cited

U.S. PATENT DOCUMENTS

| | | | |
|---|---|---|---|
| 6,925,135 B2 | 8/2005 | Smith et al. | |
| 7,388,937 B1 * | 6/2008 | Rodger et al. | 375/348 |
| 8,487,653 B2 | 7/2013 | Tarng et al. | |
| 2003/0067656 A1 * | 4/2003 | Gentile | 359/158 |
| 2005/0031029 A1 * | 2/2005 | Yamaguchi et al. | 375/226 |
| 2011/0060546 A1 * | 3/2011 | Miller et al. | 702/120 |
| 2013/0181754 A1 | 7/2013 | Gupta | |

FOREIGN PATENT DOCUMENTS

| | | |
|---|---|---|
| EP | 0286329 A2 | 10/1988 |
| WO | 9603800 A1 | 2/1996 |
| WO | 0182506 A1 | 11/2001 |

OTHER PUBLICATIONS

"Bus Doctor Family Overview," JDSU, http://www.jdsu.com/en-us/test-and-measurement/products/a-z-product-list/Pages/bus-doctor-family-overview.aspx, printed Sep. 3, 2013, 2 pages.
"Jitter," Wikipedia, The Free Encyclopedia, http://en.wikipedia.org/wiki/Jitter, printed Sep. 3, 2013, 7 pages.

* cited by examiner

*Primary Examiner* — Christopher McCarthy
(74) *Attorney, Agent, or Firm* — Toler Law Group, PC (57) ABSTRACT

A data storage device includes a memory and a controller coupled to the non-volatile memory. The controller is coupled to a communication interface that is configured to enable communication with a host device. The controller is configured to send a signal via a first connection of the communication interface and to send a corresponding clock signal via a second connection of the communication interface. The signal is compliant with a communication protocol that specifies that the first connection of the communication interface carries the signal while the second connection of the communication interface carries the clock signal. The first connection is testable to measure the signal to generate data indicating transitions of the signal. The data excludes measurements of the clock signal. The data is analyzable to detect an indication defined by the communication protocol and to determine an estimated bit sequence of the signal.

29 Claims, 6 Drawing Sheets

METHOD AND DEVICE FOR EFFICIENT TRACE ANALYSIS

FIELD OF THE DISCLOSURE

The present disclosure is generally related to electronic devices and to verification (e.g., debugging) of electronic devices.

BACKGROUND

Non-volatile data storage devices, such as embedded memory devices and removable memory devices, have enabled increased portability of data and software applications. For example, certain multi-level cell (MLC) flash memory devices may store multiple bits in each flash memory cell, enhancing data storage density. Such increased data storage density may be associated with large amounts of data being rapidly written to and read from data storage devices. For example, a host device may write data to and read data from a data storage device using a clock signal having a frequency of several hundred megahertz (MHz) or greater.

SUMMARY

Devices capable of high data throughput may be difficult to debug, since it may be difficult for a debugging device to monitor all state changes during high-speed operation of a device that uses a high-frequency clock signal. For example, a "trace" operation that records data sent and received by a data storage device may quickly accumulate a large amount of data that is sent using the high-frequency clock signal, complicating debugging of the data storage device. A particular example of a trace process in accordance with the present disclosure may measure a signal (e.g., a command, a command response, and/or data) sent between a host device and a data storage device and ignore a clock signal sent between the host device and the data storage device. A logic analyzer may sample the signal to generate samples, and a trace analyzer may recognize certain characteristics (e.g., bit patterns) associated with a communication protocol used to send the signal. The trace analyzer may reconstruct one or more portions of the signal (e.g., a command, a command response, and/or data) without measuring the clock signal. By ignoring the clock signal, the amount of data measured during the trace process may be reduced. For example, certain conventional logic analyzers that record all states including clock signals may quickly accumulate a large amount of data, potentially overflowing a data buffer and complicating debugging operations due to the large amount of data. By ignoring the clock signal and measuring data and commands, a trace process may be more efficient as compared to such conventional systems, such as by using less memory to store trace data to enable more memory space for other data.

DETAILED DESCRIPTION

Figure 1:
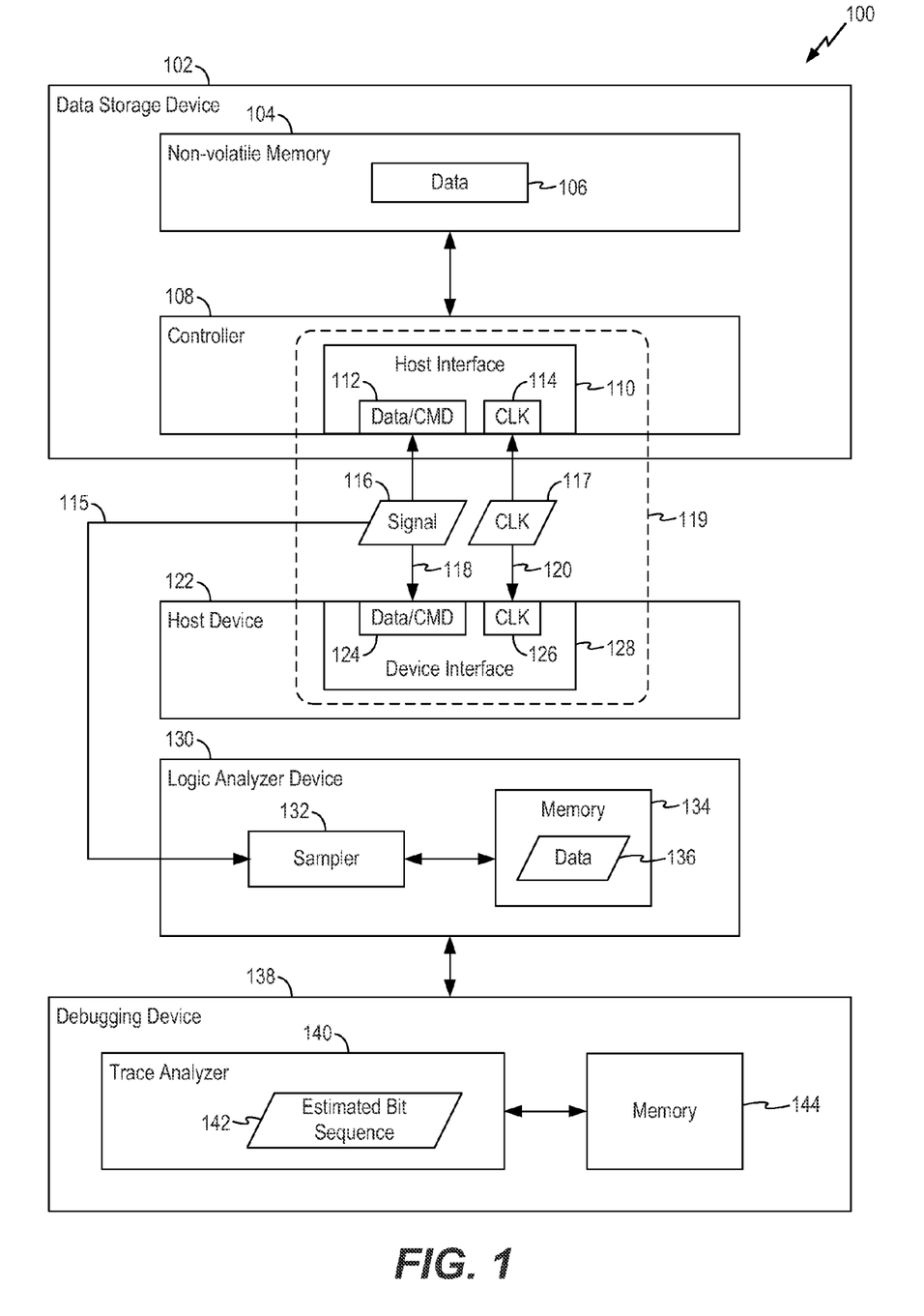
FIG. 1 is a block diagram that depicts a particular illustrative embodiment of a system including a data storage device, a host device, a logic analyzer device, and a debugging device.

Referring to FIG. 1, a particular embodiment of a system 100 includes a data storage device 102, a host device 122, a signal measuring device (e.g., a logic analyzer device 130), and a memory test device (e.g., a debugging device 138). The logic analyzer device 130 may be configured to detect (e.g., measure) signals sent between the host device 122 and the data storage device 102. The debugging device 138 may be configured to use data generated by the logic analyzer device 130 to verify operation of (e.g., debug) the data storage device 102, such as during design and testing of the data storage device 102. The debugging device 138 may be implemented as a computer that includes a processor and memory storing instructions executable by the processor to perform one or more operations described herein (e.g., to verify operation of the data storage device 102).

The data storage device 102 is coupled to the host device 122. For example, the data storage device 102 may be embedded within the host device 122, such as in accordance with an embedded MultiMedia Card (eMMC) configuration. In at least one alternate embodiment, the data storage device 102 is removable from the host device 122, such as in connection with a removable universal serial bus (USB) configuration.

To further illustrate, the data storage device 102 may correspond to a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device 102 may be configured to be coupled to the host device 122 as embedded memory, such as in connection with eMMC® (trademark of JEDEC Solid State Technology Association, Arlington, Va.) and eSD configurations, as illustrative examples. To illustrate, the data storage device 102 may correspond to an eMMC device. The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof. The data storage device 102 may operate in accordance with a double data rate (DDR) technique or a single data rate (SDR) technique.

The data storage device 102 includes a non-volatile memory 104 and a controller 108. In a particular illustrative embodiment, the non-volatile memory 104 includes a flash memory (e.g., a NAND flash memory or a NOR flash memory). In other implementations, the non-volatile memory 104 may include an erasable programmable read-only memory (EPROM), an electrically-erasable programmable read-only memory (EEPROM), a read-only memory (ROM), a one-time programmable memory (OTP), another type of memory, or a combination thereof. The non-volatile memory 104 and the controller 108 may be coupled via a bus, an interface, or other structure.

The controller 108 may include a host interface 110 configured to send signals to and to receive signals from the host device 122. In the particular example of FIG. 1, the host interface 110 includes a clock signal interface 114 and a data/command interface 112. It should be appreciated that the configuration depicted in FIG. 1 is illustrative and non-limiting. For example, the data/command interface 112 may include separate signal lines for data and commands (e.g., the data/command interface 112 may include multiple signal lines). The host interface 110 may include an embedded MultiMedia Card (eMMC) interface, a Secure Digital (SD) interface, another interface, or a combination thereof. The host interface 110 may operate in accordance with a double data rate (DDR) technique or a single data rate (SDR) technique.

The controller 108 may be configured to receive data and commands from the host device 122 via the host interface 110 (e.g., via the data/command interface 112) and to send data to the host device 122 via the host interface 110 (e.g., via the data/command interface 112). The data and commands may be sent and received by the controller 108 in accordance with a communication protocol that uses a clock signal 117. The clock signal 117 may be sent and/or received via the host interface 110 (e.g., via the clock signal interface 114). The controller 108 may be further configured to send data and commands to the non-volatile memory 104 and to receive data from the non-volatile memory 104. For example, the controller 108 is configured to send data and a write command to cause the non-volatile memory 104 to store the data to a specified address of the non-volatile memory 104. As another example, the controller 108 is configured to send a read command to read data from a specified address of the non-volatile memory 104.

The controller 108 may further include one or more components not illustrated in FIG. 1. For example, the controller 108 may include an error correcting code (ECC) engine, random access memory (RAM), or a combination thereof. The RAM may be configured to store one or more management tables (e.g., a logical-to-physical address table) usable by the controller 108. Those of skill in the art will appreciate that the controller 108 may include one or more additional components.

The ECC engine may be configured to receive data from the host device 122 and to generate a codeword based on the data. For example, the ECC engine may include an encoder configured to encode data using an ECC encoding technique. The ECC engine may include a Reed-Solomon encoder, a Bose-Chaudhuri-Hocquenghem (BCH) encoder, a low-density parity check (LDPC) encoder, a turbo encoder, an encoder configured to encode data according to one or more other ECC techniques, or a combination thereof. The ECC engine may include a decoder configured to decode data read from the non-volatile memory 104 to detect and correct, up to an error correction capability of an ECC technique, bit errors that may be present in the data. In a particular embodiment, one or more signals described herein include cyclic redundancy checksums (CRCs) that are verified by the ECC engine.

The host device 122 may include a device interface 128 configured to send signals to and to receive signals from the data storage device 102. In the particular example of FIG. 1, the device interface 128 includes a clock signal interface 126 and a data/command interface 124. The data/command interface 124 may be coupled to the data/command interface 112 via a connection 118 (e.g., a "signal line"). Although FIG. 1 depicts the connection 118 as one signal line, the connection 118 may include more than a single signal line. For example, in at least one embodiment, the connection 118 includes a first signal line for commands and one or more additional signal lines for data. The clock signal interface 126 may be coupled to the clock signal interface 114 via a connection 120. It should be appreciated that the configuration depicted in FIG. 1 is illustrative and non-limiting. For example, the data/command interface 124 may include separate signal lines for data and commands. The device interface 128 may include an embedded MultiMedia Card (eMMC) interface, a Secure Digital (SD) interface, another interface, or a combination thereof.

The system 100 further includes a communication interface 119. The communication interface 119 includes the host interface 110, the device interface 128, and the connections 118, 120. The communication interface 119 is compliant with one or more communication protocols. In a particular embodiment, the communication interface 119 is compliant with an eMMC communication protocol. One or more portions of the communication interface 119 (e.g., the connection 118) may be probed by the logic analyzer device 130, as described further below.

The host device 122 may correspond to a mobile telephone, a music player, a video player, a gaming console, an electronic book reader, a personal digital assistant (PDA), a computer, such as a laptop computer, notebook computer, or tablet, another electronic device, or a combination thereof. The host device 122 may communicate via a host controller, which may enable the host device 122 to read data from the non-volatile memory 104 and to write data to the non-volatile memory 104. The host device 122 may operate in compliance with a Joint Electron Devices Engineering Council (JEDEC) Solid State Technology Association industry specification, such as a Universal Flash Storage (UFS) Host Controller Interface specification or an embedded MultiMedia Card (eMMC) specification. The host device 122 may operate in compliance with one or more other specifications, such as a Secure Digital (SD) Host Controller specification as an illustrative example. The host device 122 may communicate with the non-volatile memory 104 in accordance with another suitable communication protocol. The host device 122 may include a processor and a memory storing instructions executable by the processor to perform one or more operations described herein.

The logic analyzer device 130 may include a sampler 132 and a memory 134. The sampler 132 may be configured to measure (e.g., sample) certain characteristics of signals sent between the host device 122 and the data storage device 102. For example, the sampler 132 may be configured to record bit transitions of signals and to record times at which the bit transitions occur (subject to any sampling error associated with the particular sampling frequency used). The memory 134 may be configured to store (e.g., buffer) data 136 measured by the sampler 132. The logic analyzer device 130 may be coupled to an interface between the host device 122 and the data storage device 102 via a probe 115 to enable the logic analyzer device 130 to probe the interface during a memory test of the data storage device 102. For example, the probe 115 may include a test lead or another connection that is coupled to the connection 118 during the memory test. In a particular embodiment, the probe 115 is coupled to the connection 118 and is not coupled to the connection 120.

The debugging device 138 may include a trace analyzer 140 and a memory 144. The memory 144 may be configured to store (e.g., buffer) data received from the logic analyzer device 130. The trace analyzer 140 may be configured to verify operation of (e.g., debug) the data storage device 102 using the data received from the logic analyzer device 130. In FIG. 1, the debugging device 138 is external to the data storage device 102, the host device 122, and the logic analyzer device 130.

During operation of the system 100, the logic analyzer device 130 may detect (e.g., measure) one or more characteristics of one or more signals sent between the host device 122 and the data storage device 102. In a particular embodiment, the logic analyzer device 130 is coupled to a data interface and/or to a command interface of one or more of the host device 122 and the data storage device 102 during a design phase of the data storage device 102. For example, the logic analyzer device 130 may be coupled to the connection 118, as illustrated in the particular example of FIG. 1. In at least one alternate embodiment, the data/command interfaces 112, 124 are coupled via multiple connections, such as via a first connection reserved for data and a second connection reserved for commands, which are each monitored by the logic analyzer device 130. The logic analyzer device 130 does not measure the clock signal 117. For example, in the particular example of FIG. 1, the logic analyzer device 130 is not coupled to the connection 120 and does not measure the clock signal 117.

The logic analyzer device 130 may detect one or more characteristics of one or more signals sent between the host device 122 and the data storage device 102. The logic analyzer device 130 may be configured in a "transitional" mode of operation in which the sampler 132 samples a signal at a particular sampling frequency and records transitions (e.g., a bit transition from a logical zero bit to a logical one bit, or vice versa) in the signal. The sampling frequency is at least twice a frequency of the clock signal 117. In a particular illustrative embodiment, the sampling frequency may be approximately four gigahertz (GHz), although the sampling frequency used will depend on the particular application (e.g., the sampling frequency may depend on the frequency of the clock signal 117).

In the example of FIG. 1, the logic analyzer device 130 may measure (e.g., sample) a signal 116 sent between the host device 122 and the data storage device 102. The signal 116 may correspond to a digital signal sent in accordance with a communication protocol that uses a clock signal, such as the clock signal 117. For example, the signal 116 may be "clocked" at a frequency of the clock signal 117. The signal 116 may be sent with (e.g., concurrently or substantially concurrently with) the clock signal 117, and thus the clock signal 117 may correspond to the signal 116. The communication protocol may be compliant with an embedded Multi-Media Card (eMMC) communication protocol, a Secure Digital (SD) communication protocol, another standard, or a combination thereof. Although the signal 116 is described in terms of a single signal, the signal 116 may correspond to multiple signals. For example, the signal 116 may include multiple signals that the logic analyzer device 130 records in real time.

The logic analyzer device 130 may include a signal measuring device that measures (e.g., probes, monitors, and/or records) the signal 116 independently of the clock signal 117. For example, the logic analyzer device 130 measures the signal 116 while "ignoring" the clock signal 117 even though the signal 116 is typically detected at an electric device using the clock signal 117 (e.g., to synchronize the signal 116 to avoid clock skew, etc.). In a particular embodiment, the collective data size of the signal 116 and the clock signal 117 exceeds a particular storage threshold associated with the memory 134, the memory 144, or a combination thereof. As an example, measuring both the signal 116 and the clock signal 117 may cause data overflow at the memory 134 and/or may consume an excessive amount of storage at the memory 134, thus reducing available memory space with which to buffer other data. Accordingly, the signal 116 may be measured by the logic analyzer device 130 without the logic analyzer device 130 measuring the clock signal 117. In this case, the signal 116 is associated with a data size that is less than the particular storage threshold (i.e., does not overflow the memory 134).

The signal 116 may include commands sent from the host device 122 to the data storage device 102 (e.g., commands to write data 106 to the non-volatile memory 104 or to read the data 106 from the non-volatile memory 104). The signal 116 may include command responses sent from the data storage device 102 to the host device 122. For example, the signal 116 may include the data 106 in response to a command from the host device 122 to read the data 106 from the non-volatile memory 104. Signals sent between the data storage device 102 and the host device 122 may include other information. As a particular example, if data requested by the host device 122 is unavailable (e.g., cannot be properly decoded), the signal 116 may include a bit pattern associated with a communication protocol indicating to the host device 122 that the data requested by the host device 122 is unavailable.

The sampler 132 of the logic analyzer device 130 may measure the signal 116. For example, the sampler 132 may measure (i.e., probe, monitor, and/or record) voltage transitions of the signal 116. The logic analyzer device 130 may record data, such as the data 136, at the memory 134 based on measurements of the signal 116. The data 136 may indicate transitions of the signal 116, such as a transition from a logical zero bit to a logical one bit at a first sampling time and a transition from the logical one bit to the logical zero bit at a second sampling time. The data 136 excludes measurements of the clock signal 117.

The debugging device 138 may be responsive to the logic analyzer device 130. For example, the debugging device 138 may buffer the data 136 at the memory 144. The trace analyzer 140 may analyze the data 136 to detect an indication (e.g., a particular header, preamble, and/or bit pattern) defined by the communication protocol used to send the signal 116. For example, depending on the particular communication protocol used to send the signal 116, a message (e.g., a command) may begin with a certain bit pattern (e.g., a predetermined bit sequence).

As a particular example, the signal 116 may include an eMMC communication protocol element. The eMMC communication protocol element may begin with a bit transition from a logical one bit to a logical zero bit. The eMMC communication protocol element may include a bit pattern of 48 bits. The bit pattern may begin with a logical zero bit and end with a logical one bit. The bit pattern may include one or more cyclic redundancy checksums (CRCs). Depending on the particular communication protocol, the trace analyzer 140 may analyze the data 136 to detect one or more indications in the data 136. For example, the trace analyzer 140 may analyze the data 136 to detect a bit pattern of 48 bits that begins with a particular logical value of a start bit (e.g., a logical zero bit), that ends with a particular logical value of an end bit (e.g., a logical one bit), and/or that includes a valid CRC (e.g., a CRC field having a valid sum). In this case, the indication corresponds to the start bit. Upon detecting the indication, 47 bits following the start bit may be detected to recognize a 48 bit pattern. The 48 bit pattern may correspond to an eMMC communication protocol element (e.g., an eMMC command).

The trace analyzer 140 may determine an estimated bit sequence 142 of the signal 116 in response to detecting the indication. For example, based on the data 136 and based on an estimated frequency of the clock signal 117, the trace analyzer 140 may "reconstruct" the signal 116 (or a portion thereof) to generate the estimated bit sequence 142. The trace analyzer 140 may "reconstruct" the clock signal 117, by determining an estimated start time and an estimated clock frequency of the clock signal 117. The estimated frequency of the clock signal 117 may be determined based on the particular communication protocol used to send the signal 116 (e.g., because the particular communication protocol may use a predetermined clock signal frequency, a programmer of the logic analyzer device 130 may program the estimated clock frequency to the logic analyzer device 130). Alternatively or in addition, the estimated frequency of the clock signal 117 may be determined by analyzing the data 136 (e.g., based on bit transitions indicated by the data 136). As a particular example, if the communication protocol specifies that a valid message is to begin with a logical zero value having a duration of a single clock cycle, then a recognized logical zero value may be used to determine the estimated frequency of the clock signal 117.

To determine the estimated bit sequence 142, the trace analyzer 140 may determine an estimated clock period of the clock signal 117 based on an estimated number of bits of the estimated bit sequence 142. For example, if the indication includes a particular bit pattern associated with the communication protocol, then the trace analyzer 140 may measure a time duration associated with the particular bit pattern. The trace analyzer 140 may divide the time duration by the number of bits to determine the estimated clock period of the clock signal 117.

The trace analyzer 140 may determine whether the estimated bit sequence 142 includes one or more "jittered" bits or jittered bit transitions. To illustrate, if the estimated bit sequence 142 includes a bit transition between a first bit and a second bit (e.g., from a logical zero bit to a logical one bit, or vice versa), then the time at which the transition occurred may be uncertain subject to the sampling frequency used by the sampler 132. That is, the particular time at which the bit transition occurred may have an uncertainty of one period of a sampling frequency according to which the first bit and the second bit are sampled. Accordingly, if the bit transition occurs within one sampling period of the sampling frequency used by the sampler 132, then the bit transition is jittered within a threshold time duration (e.g., within the one sampling period of the sampling frequency used by the sampler 132).

If the trace analyzer 140 determines that one or more bits of the estimated bit sequence 142 are jittered, the trace analyzer 140 may adjust the estimated clock period of the clock signal 117, an estimated start time of the clock signal 117, an estimated start time of the bit sequence 142, or a combination thereof. For example, an estimated start time of the estimated bit sequence 142 may be adjusted (e.g., "moved" earlier or later with respect to a reconstructed version of the clock signal 117) so that no bit transition of the estimated bit sequence 142 is jittered (i.e., so that no estimated clock edge of a reconstructed version of the clock signal 117 occurs during a bit transition of the estimated bit sequence 142). Alternatively or in addition, the estimated start time of the clock signal 117 may be adjusted (i.e., "moved" earlier or later with respect to the estimated bit sequence 142) so that no bit of the estimated bit sequence 142 is jittered. If the estimated clock period and the estimated start time cannot be adjusted so that no bits of the estimated bit sequence 142 are jittered, then a determination may be made that the estimated bit sequence 142 is not a valid message in accordance with the communication protocol used to send the signal 116. For example, the estimated bit sequence 142 may correspond to a "glitch" (e.g., thermal noise, electrical interference, etc.). Particular illustrative examples of adjusting the estimated clock period and adjusting the estimated start time are described further with reference to FIG. 6.

If the trace analyzer 140 determines that no bit of the estimated bit sequence 142 is jittered, the trace analyzer 140 may determine that the signal 116 includes the estimated bit sequence 142. The debugging device 138 may use the estimated bit sequence 142 to verify operation of (e.g., debug) the data storage device 102. As a particular illustrative example, if the estimated bit sequence 142 corresponds to a command to read data (e.g., the data 106) from a particular address of the non-volatile memory 104, then the data storage device 102 sends a command response including the data. Upon recognizing the command, signals sent from the data storage device 102 to the host device 122 may be monitored using one or more techniques described herein, such as the techniques described with reference to FIG. 1. If the data storage device 102 returns the data, then a determination may be made that the data storage device 102 responded to the command properly (e.g., in accordance with a design specification that defines operation of the data storage device 102). If the data storage device 102 does not return the data, then a determination may be made that the data storage device 102 may include a defect (e.g., a design defect, a process defect, another defect, or a combination thereof).

Because the estimated bit sequence 142 is determined without directly measuring the clock signal 117, operation of the system 100 may be simplified. For example, because operation of the system 100 may include "gaps" of time during which no commands, command responses, or data is sent between the data storage device 102 and the host device 122, conventional logic analyzers that record the clock signal 117 may record a large amount of "empty" data during the gaps of time. Recording such data may cause one or both of the memories 134, 144 to reach capacity or to overflow. Accordingly, by determining the estimated bit sequence 142 based on evaluating the data 136 to identify transitions of the signal 116, operation of the system 100 may be simplified as compared to logic analyzers that rely on measurements of clock signals. By ignoring the clock signal 117, a trace process may be more efficient as compared to conventional systems, such as by using less memory to store trace data to enable more memory space for other data.

Figure 2:
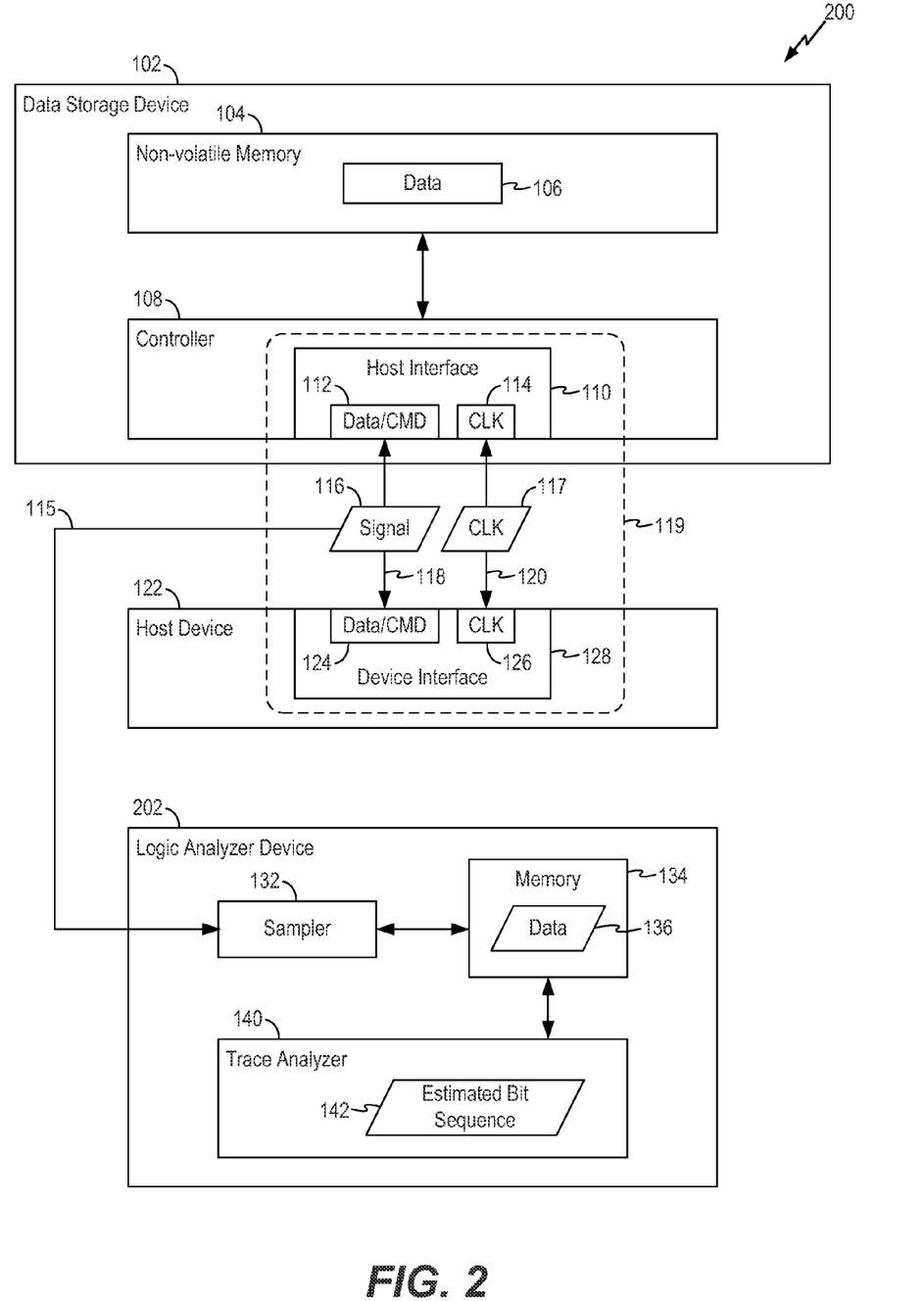
FIG. 2 is a block diagram that depicts a particular illustrative embodiment of a system including a data storage device, a host device, and a logic analyzer device.

Referring to FIG. 2, a particular illustrative embodiment of a system is depicted and generally designated 200. Certain components and operations of the system 200 may be as described with reference to the system 100 of FIG. 1. For example, the system 200 may include the data storage device 102 and the host device 122.

The data storage device 102 may include the non-volatile memory 104, which may store the data 106. The data storage device 102 may further include the controller 108, which may include the host interface 110. The host interface 110 may include the data/command interface 112 and the clock signal interface 114.

The host device 122 may include the device interface 128, and the device interface 128 may include the data/command interface 124 and the clock signal interface 126. The data/command interfaces 112, 124 may be coupled via the connection 118, and the clock signal interfaces 114, 126 may be coupled via the connection 120. The host device 122 and the data storage device 102 may send and receive one or more signals, such as the signal 116 and the clock signal 117.

The system 200 may further include a logic analyzer device 202. The logic analyzer device 202 may include the sampler 132, the memory 134, and the trace analyzer 140. The memory 134 may store the data 136. The trace analyzer 140 may determine the estimated bit sequence 142.

In the particular example of FIG. 2, the logic analyzer device 202 is configured to perform certain debugging operations. For example, the trace analyzer 140 of the logic analyzer device 202 may perform one or more operations described with reference to FIG. 1, such as by probing the communication interface 119 via the probe 115. In a particular embodiment, the system 200 of FIG. 2 corresponds to an "online" or "real-time" embodiment in which the logic analyzer device 202 performs one or more trace operations associated with the signal 116 in real time (e.g., while concurrently, or substantially concurrently, measuring the signal 116).

The system 200 of FIG. 2 may enable simplified trace analysis for certain applications associated with lower data rates (e.g., applications in which the frequency of the clock signal 117 is less than a particular threshold). For example, by including the trace analyzer 140 in the logic analyzer device 202, use of a separate debugging device (e.g., the debugging device 138) may be avoided. In a particular embodiment, the real time (or near real time) trace analysis is enabled at least in part due to less data collected in the memory 134, as explained with reference to FIG. 1. For example, by determining the estimated bit sequence 142 without physically measuring the clock signal 117, the amount of data stored in the memory 134 is reduced as compared to logic analyzers that measure the clock signal 117. The amount of data may be stored within (i.e., does not exceed a memory size (e.g., capacity) of) the memory 134, thus avoiding overflow and data loss at the memory 134. Thus, the system 200 of FIG. 2 may enable real time (or near real time) trace operations without measurement of the clock signal 117 and without overflowing a buffer.

Figure 3:
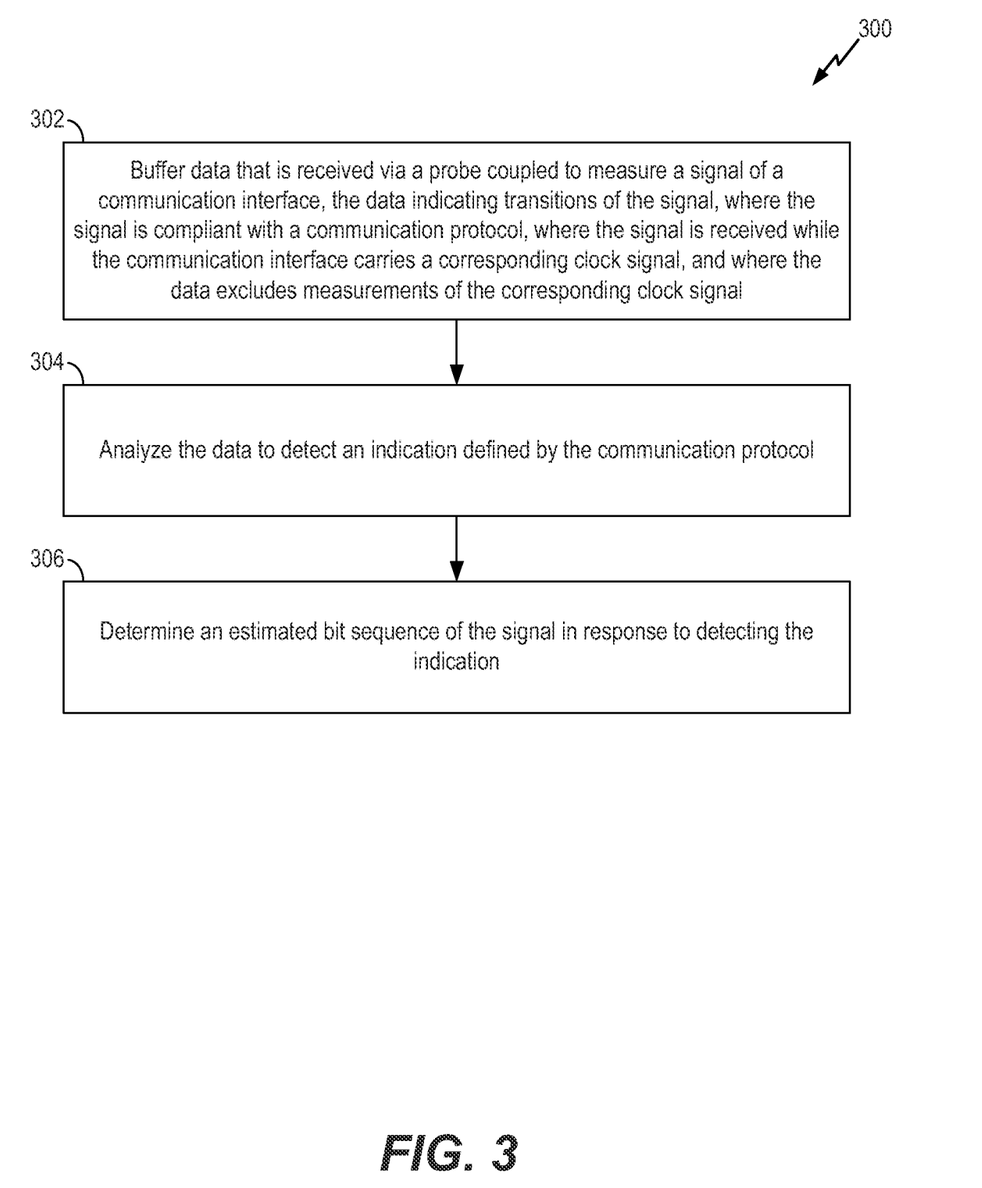
FIG. 3 is a flow diagram that depicts a particular illustrative embodiment of a method of operation of a logic analyzer device, such as the logic analyzer device of FIG. 2.

Referring to FIG. 3, a particular illustrative embodiment of a method is depicted and generally designated 300. The method 300 may be performed by one or more components of the system 100 of FIG. 1, the system 200 of FIG. 2, or a combination thereof. As a particular example, the method 300 may be performed by a logic analyzer device, such as the logic analyzer device 202 of FIG. 2.

The method 300 includes buffering data that is received via a probe coupled to measure a signal of a communication interface, at 302. The data indicates transitions of the signal, and the signal is compliant with a communication protocol. The signal is received while the communication interface carries a corresponding clock signal, and the data excludes measurements of the clock signal. For example, referring again to FIG. 1, the signal may correspond to the signal 116, and the data may correspond to the data 136. The clock signal that corresponds to the signal 116 may be the clock signal 117. The data 136 does not include measurements of the clock signal 117 (because the clock signal 117 is not measured by the probe 115). Thus, measurements of the clock signal 117 are excluded from (i.e., not included in) the data 136. The communication interface may correspond to the communication interface 119, and the probe may correspond to the probe 115.

In a particular embodiment, the data (e.g., the data 136) is buffered at a memory of the logic analyzer device (e.g., the memory 134), the memory has a memory size, and the data size of the signal and the corresponding clock signal exceeds the memory size. For example, if the logic analyzer device were to buffer samples of both the signal and the corresponding clock signal, the memory may quickly reach capacity, potentially resulting in overflow and loss of data. The data size of the signal (without clock signal data) may be less than the memory size of the memory (e.g., may not cause overflow at the memory).

The method 300 may further include analyzing the data to detect an indication defined by the communication protocol, at 304. The indication may correspond to a particular bit pattern associated with the communication protocol, as described with reference to FIG. 1. For example, the data may be analyzed for certain bit patterns that indicate commands (e.g., a memory command to read or write data) and/or command responses associated with the communication protocol. Alternatively or in addition, the data may be analyzed for bit sequences of a particular length (e.g., 48 bits, 136 bits, or another number of bits).

In a particular embodiment, the indication is associated with a particular bit length, a particular logical value of a start bit, a particular logical value of an end bit, and a valid cyclic redundancy checksum (CRC). The estimated bit sequence may be determined in response to determining that the indication includes the particular bit length, the particular logical value of the start bit, the particular logical value of the end bit, and the valid CRC. If the estimated bit sequence does not include one or more of the particular bit length, the particular logical value of the start bit, the particular logical value of the end bit, or the valid CRC, then the indication may be determined to not correspond to a valid command in accordance with the communication protocol (e.g., the indication may correspond to a "glitch," noise, etc.). The communication protocol may correspond to an embedded MultiMedia Card (eMMC) communication protocol, and the valid command may correspond to a memory command of the eMMC communication protocol (e.g., a command to read or write data to the non-volatile memory 104, a command response sent by the controller 108 in response to the command, and/or data to be written to or read from the non-volatile memory 104).

The method 300 may further include determining an estimated bit sequence of the signal in response to detecting the indication, at 306. The estimated bit sequence may correspond to the estimated bit sequence 142. Determining that the signal includes the estimated bit sequence may enable verification of operation (e.g., debugging) of a device. For example, the method 300 may include verifying operation of the data storage device 102 using the estimated bit sequence, such as by verifying whether one or more of the data storage device 102, the host device 122, and the connection 118 is operating correctly (i.e., in accordance with design specifications).

The method 300 of FIG. 3 may enable simplified trace operations, such as debugging of a device. For example, certain conventional logic analyzers that record all states including clock signals may quickly accumulate a large amount of data, potentially overflowing a data buffer and complicating debugging operations due to the large amount of data. By ignoring the clock signal and measuring data and commands, a trace process may be more efficient as compared to such conventional systems, such as by using less memory to store trace data to enable more memory space for other data.

Figure 4:
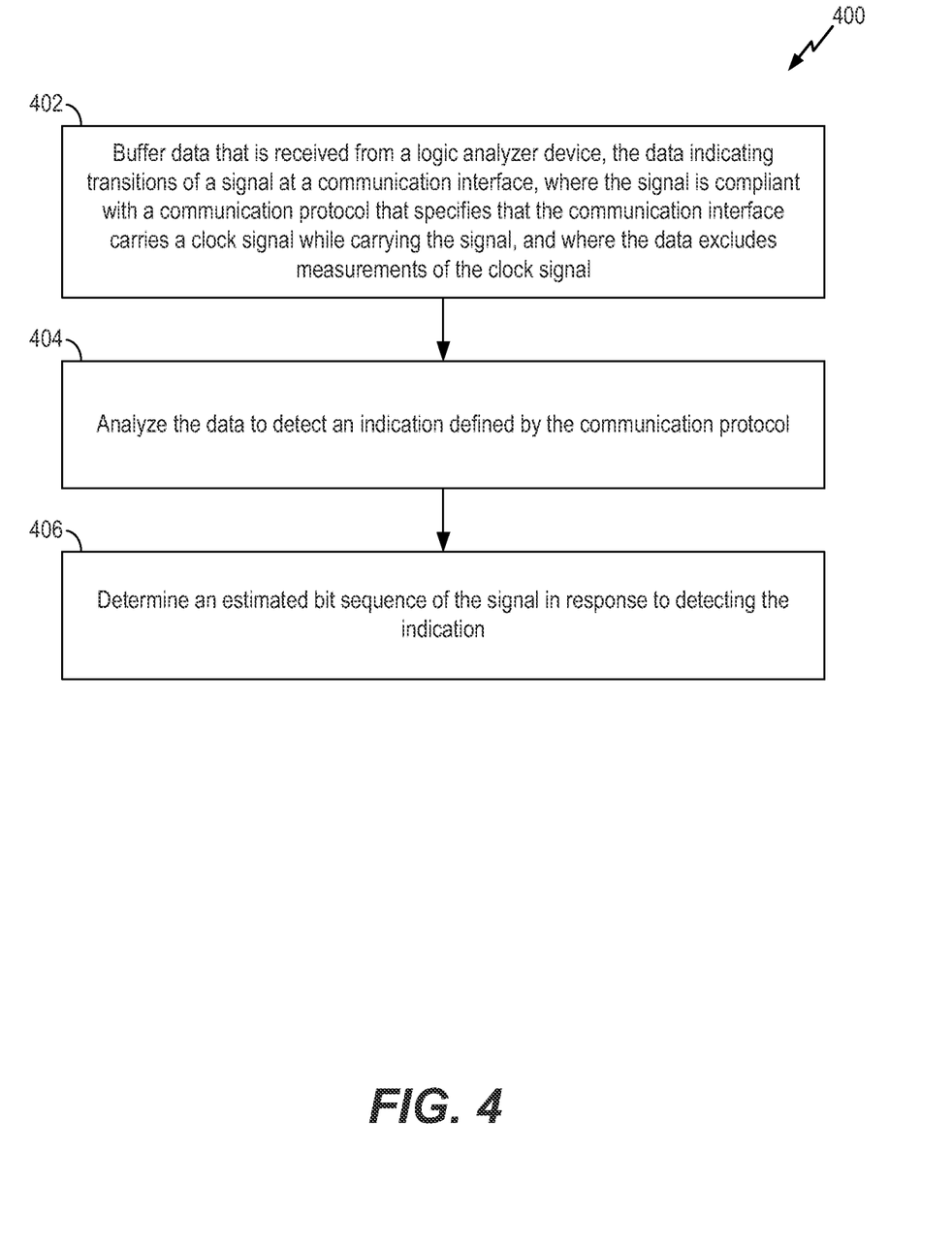
FIG. 4 is a flow diagram that depicts a particular illustrative embodiment of a method of operation of a computer, which may correspond to the debugging device of FIG. 1.

Referring to FIG. 4, a particular illustrative embodiment of a method is depicted and generally designated 400. The method 400 may be performed by one or more components of the system 100 of FIG. 1, the system 200 of FIG. 2, or a combination thereof. As a particular example, the method 400 may be performed by a computer (e.g., the debugging device 138).

The method 400 includes buffering data that is received from a logic analyzer device, at 402. The data may correspond to the data 136, and the logic analyzer device may correspond to the logic analyzer device 130. The data indicates transitions of a signal at a communication interface. The signal may correspond to the signal 116, and the communication interface may correspond to the communication interface 119. The signal is compliant with a communication protocol that specifies that the communication interface carries a clock signal while carrying the signal. The clock signal may correspond to the clock signal 117. The data excludes measurements of the clock signal (because the clock signal 117 is not measured by the probe 115).

The method 400 may further include analyzing the data to detect an indication defined by the communication protocol, at 404. The indication may correspond to a particular bit pattern associated with the communication protocol, as described with reference to FIG. 1. For example, the data may be analyzed for certain bit patterns that indicate commands (e.g., a memory command to read or write data) and/or command responses associated with the communication protocol. Alternatively or in addition, the data may be analyzed for bit sequences of a particular length (e.g., 48 bits, 136 bits, or another number of bits).

The method 400 may further include determining an estimated bit sequence of the signal in response to detecting the indication, at 406. The estimated bit sequence may correspond to the estimated bit sequence 142. Determining that the signal includes the estimated bit sequence may enable verification of operation (e.g., debugging) of a device. For example, the method 400 may include verifying operation of the data storage device 102 using the estimated bit sequence, such as by verifying whether one or more of the data storage device 102, the host device 122, and the connection 118 is operating correctly (i.e., in accordance with one or more design specifications).

The method 400 may enable simplified trace analysis for certain applications associated with higher data rates (e.g., applications in which the frequency of the clock signal 117 satisfies a particular threshold). As a particular illustrative example, if a data size of the data 136 exceeds a memory capacity and/or processing capability of the logic analyzer device 130, the data 136 may be "offloaded" to a computer, such as the debugging device 138, to analyze the data for one or more indications associated with the communication protocol that is used to send the signal 116. Further, because the data 136 excludes measurements of the clock signal 117, communication and analysis of the data 136 is simplified as compared to certain conventional systems that measure and store clock signal data to enable trace analysis operations.

Figure 5:
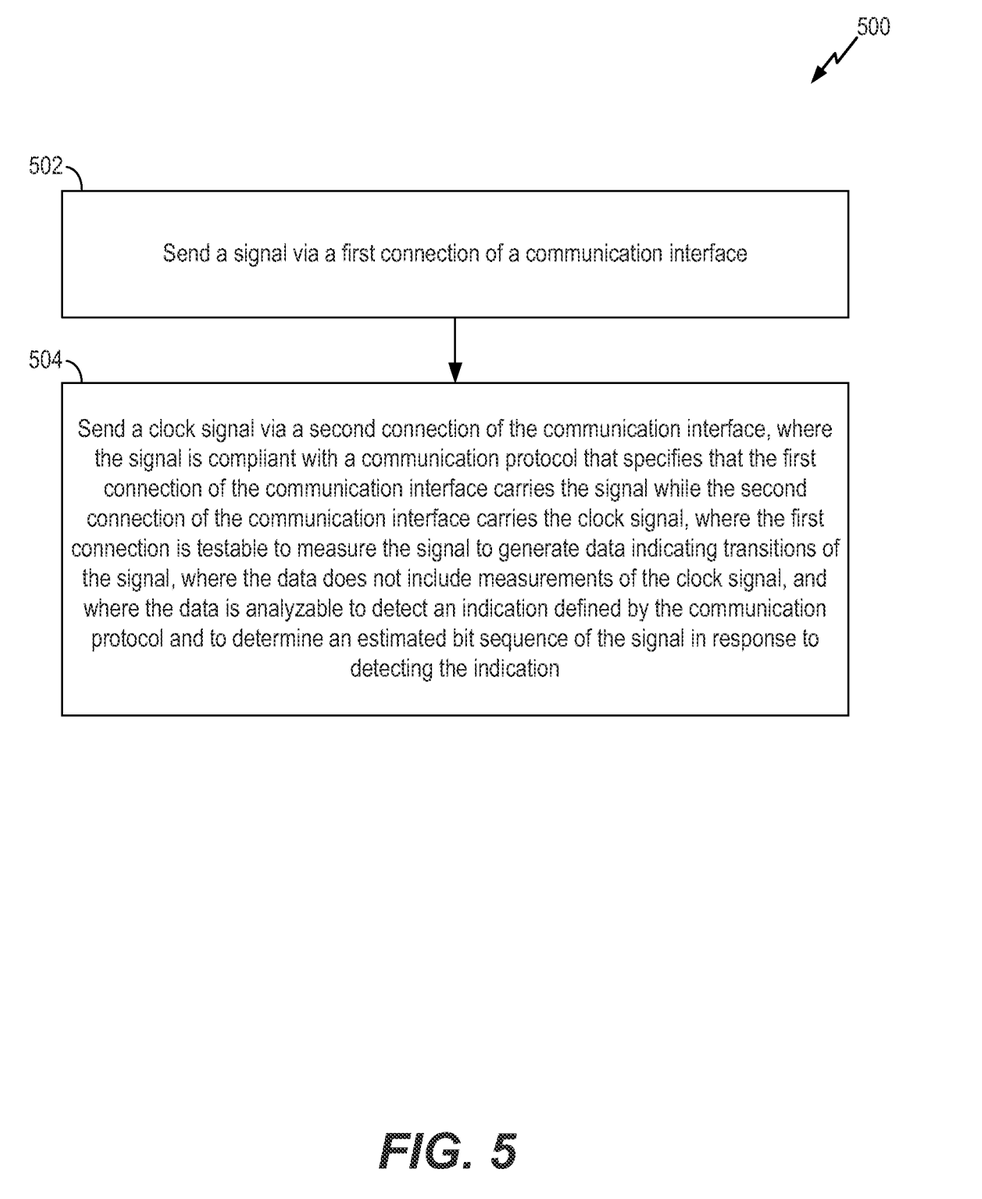
FIG. 5 is a flow diagram that depicts a particular illustrative embodiment of a method of operation of a data storage device, such as the data storage device of FIG. 1.

Referring to FIG. 5, a particular illustrative embodiment of a method is depicted and generally designated 500. The method 500 may be performed by one or more components of the system 100 of FIG. 1, the system 200 of FIG. 2, or a combination thereof. As a particular example, the method 500 may be performed by the data storage device 102.

The method 500 includes sending a signal via a first connection of a communication interface, at 502. The signal may correspond to the signal 116, and the communication interface may correspond to the communication interface 119. The first connection may correspond to the connection 118.

The method 500 further includes sending a clock signal via a second connection of the communication interface, at 504. The clock signal may correspond to the clock signal 117, and the second connection may correspond to the connection 120. The signal is compliant with a communication protocol that specifies that the first connection of the communication interface carries the signal while the second connection of the communication interface carries the clock signal. The communication protocol may correspond to an eMMC communication protocol, an SD communication protocol, or another communication protocol. The first connection is testable (e.g., can be tested by a probe, such as the probe 115) to measure the signal to generate data indicating transitions of the signal. The data may correspond to the data 136. The data excludes measurements of the clock signal (because the clock signal 117 is not measured by the probe 115). The data is analyzable to detect an indication defined by the communication protocol and to determine an estimated bit sequence of the signal in response to detecting the indication. The estimated bit sequence may correspond to the estimated bit sequence 142.

Because the communication interface is testable to measure the signal to generate the data, the method 500 may enable debugging of a device, such as the data storage device 102. For example, one or more of the logic analyzer device 202 and the debugging device 138 may use the data to verify operation of the data storage device 102 (e.g., using one or more operations of the methods 300, 400, respectively). Further, because the data excludes measurements of the clock signal, the data can be communicated and analyzed efficiently, such as without overflowing one or both of the memories 134, 144.

Figure 6:
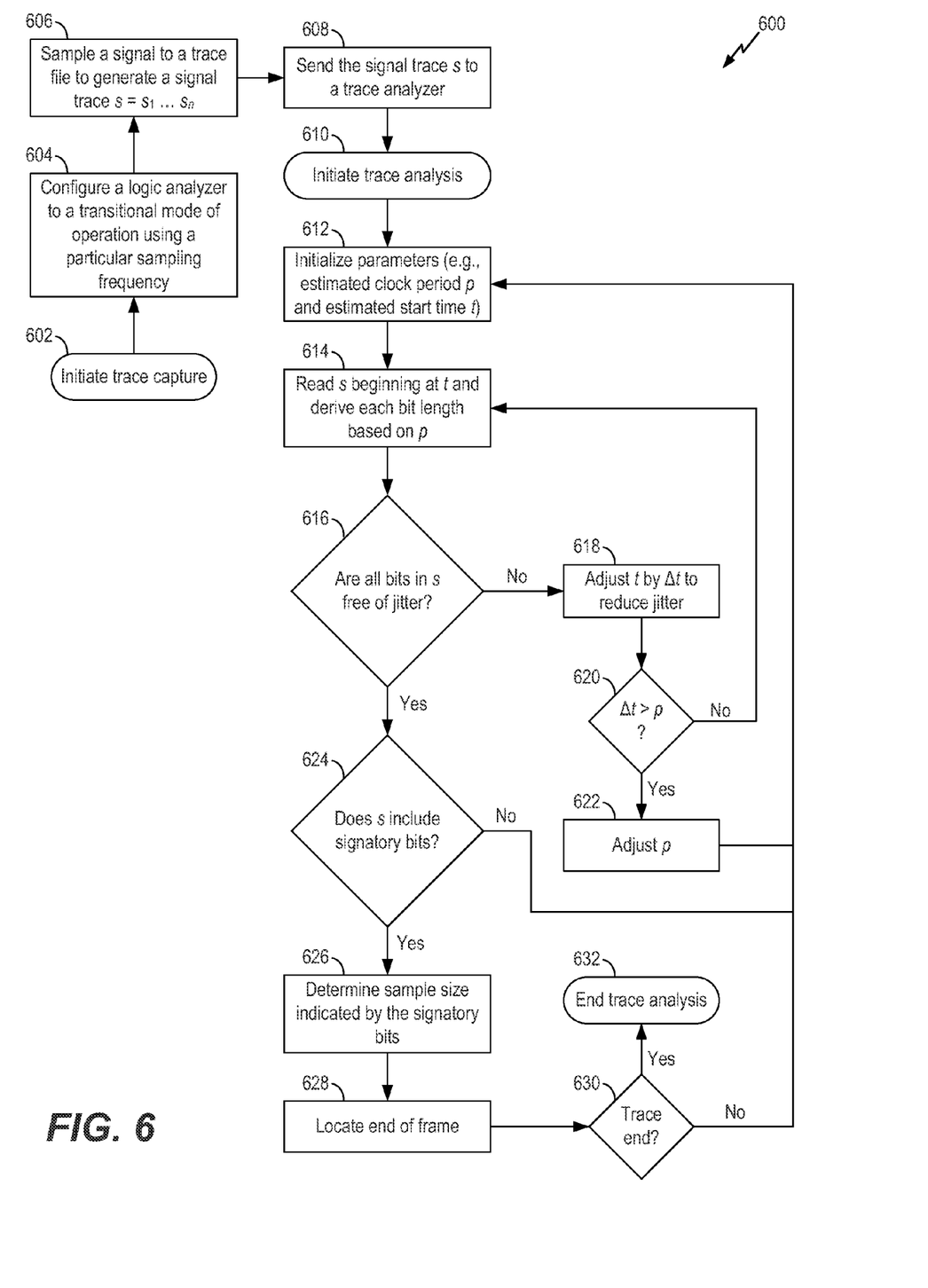
FIG. 6 is a flow diagram that depicts a particular illustrative embodiment of a method of operation of one or more devices of the system of FIG. 1, one or more devices of the system of FIG. 2, or a combination thereof.

Referring to FIG. 6, a particular illustrative embodiment of a method of verifying operation of a device, such as a data storage device, is depicted and generally designated 600. The method 600 may be performed by one or more components of the system 100 of FIG. 1, the system 200 of FIG. 2, or a combination thereof. The method 600 of FIG. 6 may be performed alternatively or in addition to performing the methods 300, 400, and 500.

The method 600 may include initiating (e.g., by the logic analyzer device 130) a trace capture, at 602. For example, a trace capture may be performed at the logic analyzer device 130 to capture the data 136 indicating one or more transitions of the signal 116 sent between the host device 122 and the data storage device 102. The method 600 may further include configuring a logic analyzer to a transitional mode of operation using a particular sampling frequency, at 604. The transitional mode of operation may correspond to a mode of operation in which transitions of the signal 116 are recorded (e.g., to generate the data 136). The logic analyzer may correspond to the logic analyzer device 130. The particular sampling frequency is at least twice the clock frequency of the clock signal 117. The clock frequency of the clock signal 117 may be determined with reference to a communication protocol used to send signals that are sampled by the logic analyzer. The particular sampling frequency may correspond to a frequency with which the logic analyzer checks for changes (i.e., bit transitions) of a signal.

The method 600 may further include sampling a signal to a trace file to generate a signal trace s=s1, s2, sn, where n is an integer large enough to capture one or more indications (e.g., one or more bit patterns) of the signal, at 606. For example, if a particular command associated with a communication protocol is expected to include a pattern of 48 bits, then n≥48. The signal may correspond to the signal 116. The signal trace s may correspond to the data 136. The signal may be sent in accordance with a communication protocol.

The method 600 may further include sending the signal trace s to a trace analyzer, at 608. The trace analyzer may correspond to the trace analyzer 140. The method 600 may further include initiating a trace analysis, at 610. The trace analysis may be performed at the debugging device 138 of FIG. 1, the logic analyzer device 202 of FIG. 2, or a combination thereof. The signal trace s may be sampled by the sampler 132 and may be communicated via an electrical connection between the logic analyzer device 130 and the trace analyzer.

The method 600 may further include initializing parameters, at 612. The parameters may include an estimated clock period p of a clock signal used to send the signal, an estimated start time t (i.e., offset) of the clock signal, or a combination thereof. The clock signal may correspond to the clock signal 117. The clock signal may be associated with the communication protocol used to send the signal. In a particular embodiment, the estimated clock period p is initialized based on an expected clock period (e.g., based on the particular communication protocol associated with a design specification of a device to be debugged) minus the duration of one sampling period of the sampling frequency used to sample the signal. To reduce jitter, the estimated clock period p may then be incremented up to an upper bound of the expected clock period plus the duration of one sampling period of the sampling frequency used to sample the signal, as explained further below.

To further illustrate, the estimated clock period p may be determined based on an estimated number of bits of a sequence of "signatory bits." The signatory bits may correspond to the indication (e.g., bit pattern) described above with reference to FIG. 1. For example, if messages sent using the communication protocol typically include a certain bit pattern (e.g., a bit pattern including k bits, where a starting bit of the bit pattern has a first logical value and an ending bit of the bit pattern has a second logical value), the trace analyzer may measure a time duration d during which the bit pattern is sent (e.g., an elapsed time from an estimated beginning of the starting bit to an estimated end of the ending bit). In a particular embodiment, the estimated clock period p is determined according to $p=d/k$. The estimated start time t may be determined according to a suitable technique, such as by initializing the estimated start time t to correspond with the beginning of the starting bit of the signatory bits.

The method 600 may further include reading the signal trace s beginning at the start time t, at 614. The method 600 may further include determining whether all bits in the signal trace s are free of jitter, at 616. For example, if the signal trace s includes a bit transition between a first bit and a second bit (e.g., from a logical zero bit to a logical one bit, or vice versa) that occurs within a threshold time duration (e.g., one sampling period of the sampling frequency used to sample the signal), then the bit transition is jittered.

If the signal trace s includes one or more jittered bits, the method 600 may further include adjusting the estimated start time t to reduce the jitter, at 618. In a particular embodiment, the estimated start time t is adjusted by adding $\Delta t$ to t (i.e., by incrementing t) until the bit transition does not occur within one sampling period of the sampling frequency. For example, if the bit transition occurs within one sampling period of the sampling frequency, then the time at which the bit transaction occurred may be uncertain within one period of the sampling frequency. As a particular illustrative example, if the signal trace s includes samples of "1," "1," "1," and "0," then the signal trace s includes at least one bit transition from a logical one value to a logical zero value (from "1" to "0"). The bit transition occurs somewhere between the "1" sample and the "0" sample, but the precise time of the bit transition may be uncertain if a clock edge of a reconstructed version of the clock signal 117 falls in between the "1" sample and the "0" sample (e.g., the bit transition may be subject to sampling error). The clock edge may therefore be shifted (e.g., to the left) such that the clock edge falls on or between similar values of the samples (e.g., on or between the first two "1" bits of the samples in the foregoing example). Accordingly, the estimated start time t may be incremented by $\Delta t$ until an estimated clock edge of the clock signal no longer occurs during the bit transition (i.e., no longer occurs in the time interval between a recorded first logical value and a recorded second logical value following the recorded first logical value).

The method 600 may further include determining whether $\Delta t$ (i.e., the amount by which t is incremented so that the bit transition does not occur within one sampling period of the sampling frequency) is greater than the estimated clock period p, at 620. If $\Delta t$ is greater than the estimated clock period p, then the method 600 may further include determining that signatory bits are not present in the signal trace s given the current value of the estimated clock period p. Accordingly, the method 600 may further include adjusting the estimated clock period p, at 622. In a particular embodiment, the estimated clock period p is adjusted within a range of $[p-x, p+x]$, where x indicates the duration of one sampling period of the sampling frequency used to sample the signal. In a particular embodiment, if the adjusted estimated clock period p exceeds a valid range for the particular communication protocol, then a determination is made that the signal trace s does not include a valid message in accordance with the particular communication protocol. If $\Delta t$ is not greater than the estimated clock period p, then the method 600 may further include reading the signal trace s beginning at $t+\Delta t$, at 614.

If a determination is made, at 616, that all bits in the signal trace s are free of jitter, then the method 600 may further include determining whether the signal trace s includes signatory bits, at 624. In a particular embodiment, the signatory bits correspond to the estimated bit sequence 142. If the signal trace s does not include signatory bits (e.g., if the signal trace s does not include a recognized bit pattern, such as a predetermined bit pattern indicating the beginning of a command or a response), the parameters may be reinitialized, at 612. In a particular embodiment, the signatory bits correspond to a valid message in accordance with the communication protocol. The signatory bits may include a cyclic redundancy checksum (CRC) that is verified by an error correcting code (ECC) engine of the controller 108.

If a determination is made that the signal trace s includes signatory bits, then the method 600 may further include determining a sample size indicated by the signatory bits, at 626. The method 600 may further include locating a frame end, at 628. To illustrate, if the communication protocol uses commands of a fixed size, command responses of a fixed size, and data blocks of a fixed size, then the frame end may be determined by counting bits of commands, command responses, and/or data blocks until the fixed size is reached. As a particular example, an eMMC communication protocol may use 48-bit commands, 48- or 136-bit command responses, and data blocks having a size determined by a bus size of the connection 118 and by the sizes of blocks that carry the data blocks. The data blocks may be of a 512-byte length or of a 4096-byte length. According to further embodiments, the communication protocol may use messages of varying lengths, where an indication within a message indicates the lengths of the message. To illustrate, the communication protocol may specify that the first four bits of a message indicate a length of the message, with "0000" indicating a first length, "1010" indicating a second length, etc.

The method 600 may further include determining whether a trace end has been reached, at 630. If the trace end has not been reached, the parameters may be reinitialized, at 612. If the trace end has been reached, the method 600 may terminate, at 632.

It will be appreciated that the techniques described with reference to FIG. 6 may enable simplified trace analysis operations. For example, the techniques described with reference to FIG. 6 may enable trace analysis of a signal sent in accordance with a communication protocol without measuring a clock signal associated with the communication protocol.

In a particular embodiment, the techniques described with reference to the method 600 may be performed to recognize one or more commands from the host device 122 to the data storage device 102. One or more of the techniques may be performed to recognize a command response from the data storage device 102 (e.g., control information and/or data read from the non-volatile memory 104 in response to the command, such as the data 106). Information determined for commands may be reused for detecting command responses. For example, in at least one embodiment, the estimated clock period p determined using the method 600 may be used to detect one or more command responses sent from the data storage device 102 to the host device 122. Alternatively, the estimated clock period may be re-determined (e.g., if different clock frequencies are used for commands and command responses, depending on the particular communication protocol). In at least one embodiment, a command response has a bit length of either 48 or 136 bits, begins with a logical zero bit, ends with a logical one bit, and includes a CRC. In a particular embodiment, the CRC includes 7 bits (i.e., a 7-bit CRC).

In a particular illustrative embodiment, if the bus size (e.g., 1-bit or 4-bits) of the connection 118 is known, data block lengths can be calculated using the bus size and the size of an input/output (I/O) command associated with the communication protocol. For example, for an interface using an SDR technique and a 1-bit bus size, data block lengths may be determined to be 4114 bits (i.e., 4096 data bits plus 18 I/O command bits). As another example, for an interface using an SDR technique and a 4-bit bus size, data block lengths may be determined to be 1042 bits (i.e., 1024 data bits plus 18 I/O command bits). For an interface using an SDR technique and an 8-bit bus size or for an interface using a DDR technique and a 4-bit bus size, data block lengths may be determined to be 530 bits (i.e., 512 data bits plus 18 I/O command bits). For an interface using a DDR technique and an 8-bit bus size, data block lengths may be determined to be 274 bits (i.e., 256 data bits plus 18 I/O command bits). According to further embodiments, the bus size and/or data block lengths may be inferred by parsing multiple data blocks having different data block lengths.

In a particular embodiment, interfaces that use an SDR technique and an 8-bit bus size may be disambiguated with respect to interfaces that use a DDR technique and a 4-bit bus size (each of which utilize data block lengths of 530 bits). For example, bits of a 530-bit data block may be read at half-clock intervals. If valid data is read from the 530-bit data block using the half-clock intervals, then the interface corresponds to a DDR interface having a 4-bit bus size. If valid data is not read from the 530-bit data block using the half-clock intervals, then the interface corresponds to an SDR interface having an 8-bit bus size.

In a particular embodiment, data probed from the connection 118 may be analyzed to determine whether the data is valid. For example, bits of a 274-bit data block may be read at half-clock intervals. If valid data is read from the 274-bit data block using the half clock intervals, then the connection 118 corresponds to a DDR interface having an 8-bit bus size. Otherwise, valid data has not been probed from the connection 118.

After performing one or more techniques of the method 600, an additional "relaxed" search may be performed to determine one or more additional commands sent between the host device 122 and the data storage device 102. For example, one or more "constraints" described with reference to the method 600 may be ignored, such as verification of a CRC that is included in a sequence of signatory bits. Accordingly, a command may be recognized notwithstanding one or more corrupted bits of the command (e.g., due to noise, "glitches," etc.), which may enable additional trace analysis of the data (e.g., if a number of recognized commands, command responses, and data is insufficient to verify operation of the data storage device 102). Accordingly, by using one or more techniques described herein, one of skill in the art is enabled to verify operation of a data storage device without measuring a clock signal.

Although various components depicted herein are illustrated as block components and described in general terms, such components may include one or more microprocessors, state machines, or other circuits configured to perform one or more operations described herein. For example, the controller 108, the host device 122, the logic analyzer device 130, the debugging device 138, and the logic analyzer device 202 may each include one or more physical components, such as hardware controllers, state machines, logic circuits, one or more other structures, or a combination thereof, to perform one or more operations described herein. In a particular embodiment, the controller 108 includes a processor executing instructions that are stored in the non-volatile memory 104. Alternatively or in addition, executable instructions that are executed by the processor may be stored in a separate memory location that is not part of the non-volatile memory 104, such as in a read-only memory (ROM).

To further illustrate, according to a particular example, a processing unit of the logic analyzer device 130, a processing unit of the debugging device 138, a processing unit of the logic analyzer device 202, and/or a processing unit of the data storage device 102 may execute instructions (e.g., instructions associated with an instruction set architecture, such as an add instruction, a read instruction, a write instruction, and/or a compare instruction) to perform one or more operations described herein, such as one or more operations of the methods 300, 400, 500, and 600. The one or more operations may enable verification of operation of the data storage device 102.

In a particular embodiment, the data storage device 102 may be attached to or embedded within one or more host devices, such as within a housing of a host communication device, which may correspond to the host device 122. For example, the data storage device 102 may be integrated within a packaged apparatus such as a wireless telephone, a personal digital assistant (PDA), a gaming device or console, a portable navigation device, or other device that uses internal non-volatile memory. However, in other embodiments, the data storage device 102 may be implemented in a portable device configured to be selectively coupled to one or more external devices, such as the host device 122. In a particular embodiment, the data storage device 102 may be coupled to a non-volatile memory, such as a three-dimensional (3D)

memory, a flash memory (e.g., NAND, NOR, multi-level cell (MLC)), a divided bit-line NOR (DINOR) memory, an AND memory, a high capacitive coupling ratio (HiCR) device, an asymmetrical contactless transistor (ACT) device, or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. As a particular example, although debugging of data storage devices is described herein, it will be appreciated that a variety of devices can be debugged using one or more techniques described herein. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   in a logic analyzer device, performing:
      buffering data that is received via a probe coupled to measure a signal of a communication interface, the data indicating transitions of the signal, wherein the signal is compliant with a communication protocol, wherein the signal is received while the communication interface carries a corresponding clock signal, and wherein the data excludes measurements of the corresponding clock signal;
      analyzing the data to detect an indication defined by the communication protocol; and
      determining an estimated bit sequence of the signal in response to detecting the indication.

2. The method of claim 1, wherein the indication is associated with a particular bit length, a particular logical value of a start bit, a particular logical value of an end bit, a valid cyclic redundancy checksum (CRC), or a combination thereof.

3. The method of claim 2, wherein the estimated bit sequence is determined in response to determining that the indication includes the particular bit length, the particular logical value of the start bit, the particular logical value of the end bit, and the valid CRC, and wherein the estimated bit sequence is determined without measuring the corresponding clock signal.

4. The method of claim 3, wherein if the estimated bit sequence does not include one or more of the particular bit length, the particular logical value of the start bit, the particular logical value of the end bit, or the valid CRC, then the indication is determined to not correspond to a valid command in accordance with the communication protocol.

5. The method of claim 4, wherein the communication protocol corresponds to an embedded MultiMedia Card (eMMC) communication protocol, and wherein the valid command corresponds to a memory command of the eMMC communication protocol.

6. The method of claim 1, wherein the data is buffered at a memory of the logic analyzer device, wherein the memory has a memory size, and wherein a combined data size of the signal and the corresponding clock signal exceeds the memory size.

7. The method of claim 6, wherein a data size of the signal does not exceed the memory size.

8. The method of claim 1, wherein the data is from a data storage device that includes the communication interface and a non-volatile memory having a three-dimensional (3D) memory configuration, the data storage device also including a controller associated with operation of memory cells of the non-volatile memory.

9. A method comprising:
   in a computer, performing:
      buffering data that is received from a logic analyzer device, the data indicating transitions of a signal at a communication interface, wherein the signal is compliant with a communication protocol that specifies that the communication interface carries a clock signal while carrying the signal, and wherein the data excludes measurements of the clock signal;
      analyzing the data to detect an indication defined by the communication protocol; and
      determining an estimated bit sequence of the signal in response to detecting the indication.

10. The method of claim 9, wherein the indication corresponds to one or more of a command sent via the communication interface, a command response sent via the communication interface, or data sent via the communication interface.

11. The method of claim 9, further comprising:
    determining whether the estimated bit sequence includes a jittered bit transition; and
    in response to determining that the estimated bit sequence does not include the jittered bit transition, determining that the signal includes the estimated bit sequence.

12. The method of claim 11, farther comprising determining an estimated clock period of the clock signal based on an estimated number of bits of the estimated bit sequence.

13. The method of claim 12, wherein determining whether the estimated bit sequence includes the jittered bit transition includes determining whether an estimated clock edge of the clock signal occurs during a bit transition of the estimated bit sequence.

14. The method of claim 13, further comprising adjusting an estimated start time of the estimated bit sequence in response to determining that the estimated bit sequence includes the jittered bit transition.

15. The method of claim 14, further comprising determining whether the estimated start time is adjusted by more than the estimated clock period of the clock signal.

16. The method of claim 15, further comprising adjusting the estimated clock period of the clock signal in response to determining that the estimated start time is adjusted by more than the estimated clock period of the clock signal.

17. The method of claim 9, wherein the data is from a data storage device that includes the communication interface and a non-volatile memory having a three-dimensional (3D) memory configuration, the data storage device also including a controller associated with operation of memory cells of the non-volatile memory.

18. A method comprising:
    in a data storage device that includes a controller and a non-volatile memory, wherein the controller is coupled to a communication interface that is configured to enable communication with a host device, performing by the controller:

sending a signal via a first connection of the communication interface; and sending a clock signal via a second connection of the communication interface, wherein the signal is compliant with a communication protocol that specifies that the first connection of the communication interface carries the signal while the second connection of the communication interface carries the clock signal, wherein the first connection is testable to measure the signal to generate data indicating transitions of the signal, wherein the data excludes measurements of the clock signal, and wherein the data is analyzable to detect an indication defined by the communication protocol and to determine an estimated bit sequence of the signal in response to detecting the indication.

19. The method of claim 18, wherein the communication protocol is an embedded MultiMedia Card (eMMC) communication protocol.

20. The method of claim 19, wherein the signal corresponds to a command response sent to the host device.

21. The method of claim 20, wherein the estimated bit sequence corresponds to an eMMC protocol element sent from the controller to the host device.

22. The method of claim 21, wherein the eMMC protocol element is associated with a particular bit length, a particular logical value of a start bit of the eMMC protocol element, a particular logical value of an end bit of the eMMC protocol element, and a cyclic redundancy checksum (CRC).

23. The method of claim 18, wherein the non-volatile memory has a three-dimensional (3D) memory configuration, and wherein the controller is associated with operation of memory cells of the non-volatile memory.

24. A data storage device comprising:

a non-volatile memory; and a controller coupled to the non-volatile memory, wherein the controller is coupled to a communication interface that is configured to enable communication with a host device, wherein the controller is configured to send a signal via a first connection of the communication interface, wherein the controller is further configured to send a corresponding clock signal via a second connection of the communication interface, wherein the signal is compliant with a communication protocol that specifies that the first connection of the communication interface carries the signal while the second connection of the communication interface carries the corresponding clock signal, wherein the first connection is testable to measure the signal to generate data indicating transitions of the signal, wherein the data excludes measurements of the corresponding clock signal, and wherein the data is analyzable to detect an indication defined by the communication protocol and to determine an estimated bit sequence of the signal in response to detecting the indication.

25. The data storage device of claim 24, wherein the communication interface is compliant with an embedded MultiMedia Card (eMMC) communication protocol.

26. The data storage device of claim 25, wherein the signal corresponds to a command response sent to the host device.

27. The data storage device of claim 26, wherein the estimated bit sequence corresponds to an eMMC protocol element sent from the controller to the host device.

28. The data storage device of claim 27, wherein the eMMC protocol element is associated with a particular bit length, a particular logical value of a start bit of the eMMC protocol element, a particular logical value of an end bit of the eMMC protocol element, and a cyclic redundancy checksum (CRC).

29. The data storage of claim 24, wherein the non-volatile memory has a three-dimensional (3D) memory configuration, and wherein the controller is associated with operation of memory cells of the non-volatile memory.

* * * * *